Sept. 1, 1953  R. T. EPPERSON  2,650,428
BUTTER DISH WITH PAT SLICING MEANS
Filed Jan. 16, 1950
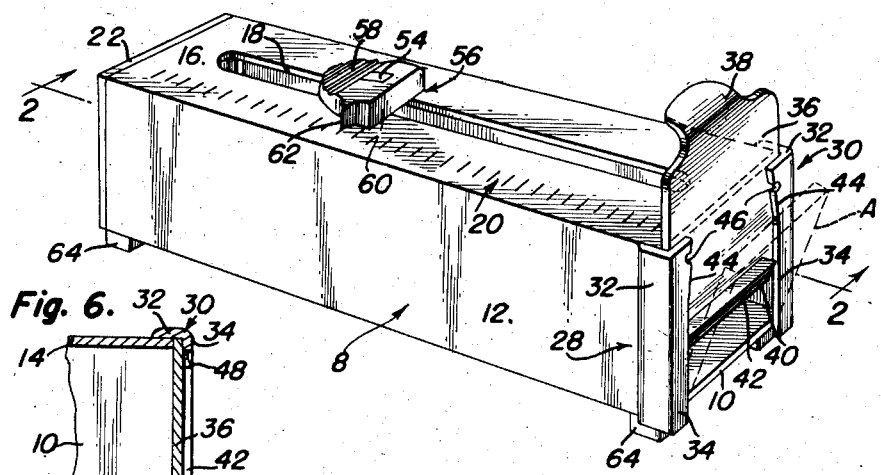
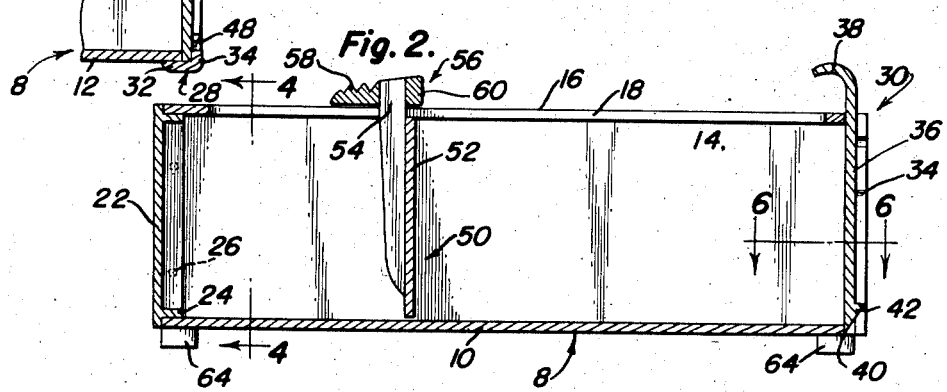
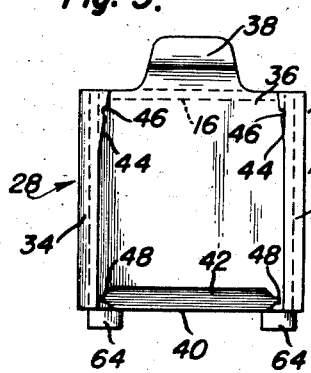
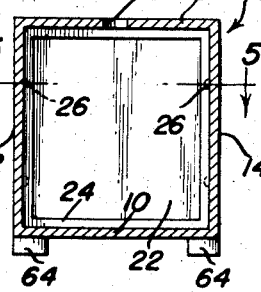
Robert Taylor Epperson
INVENTOR.
BY

Patented Sept. 1, 1953

2,650,428

UNITED STATES PATENT OFFICE 2,650,428

BUTTER DISH WITH PAT SLICING MEANS

Robert Taylor Epperson, Ponca City, Okla.

Application January 16, 1950, Serial No. 138,812

1 Claim. (Cl. 31—20)

This invention relates to kitchen and table articles and has more particular reference to a refrigerator-type butter dish which is unique in that it embodies complemental structural facilities for protectively containing a quarter-pound print of butter, for progressively feeding and ejecting the butter in a step-by-step manner and for slicing the projecting portion into conveniently usable table-size pats.

Briefly summarized, the preferred embodiment of the invention, as will be later discerned, is characterized by a print-size washable butter dish having a readily insertable and removable cover at one end and a vertically liftable and lowerable combination closing plate and pat slicer and separator at the opposite end and an accessibly operable ejector-type follower plate mounted slidably between said ends.

An over-all object of the invention is to provide a simple, practical, economical and sanitary butter dish and slicer in which manufacturers and users will find their respective requirements and needs fully met, contained and effectively available.

More specifically, it is an object of the invention to provide a transparent butter dish of appropriate unbreakable commercial plastics or the like which is rectangular in cross section and which has a friction-held, readily applicable and removable cover plate at the end opposite to the discharge end, which cover plate permits access to be had to the interior for removing the detachable follower means and thereafter conveniently washing and cleaning same, and also washing and drying the dish proper.

Another object is to provide a butter housing and protecting dish having its top provided with a scale, a slot substantially coextensive with the scale, said slot serving to accommodate an actuator carried by the follower plate, said actuator being provided with a finger grip and the latter having an index for convenient coaction with the graduations of the scale.

It is also an object of the invention to provide vertical angle members on the discharge end of the dish which define guide tracks for the liftable and lowerable closure plate, the latter having a butter cutter or knife on its lower edge which is substantially wedge-shaped in cross section so as to effectively "ride" through the print of butter and to do so in a manner to progressively dislodge the slice as it is being progressively cut, whereby to prevent the severed pat from sticking to said closure plate.

Then, too, novelty is predicated upon a multi-purpose closure plate which not only is self-separating but also has detents at opposite ends, said detents being adapted to releasably snap into keeper seats provided in the track-forming flanges of the coacting angle members, whereby to hold the knife safely "up" and out-of-the-way while the butter is inserted; or, while washing and cleaning is done.

Other objects and advantages will become more readily apparent from the following description and the accompanying illustrative drawings.

In the accompanying sheet of drawings, wherein like numerals are employed to designate like parts throughout the views:

Fig. 1 is a perspective view of a butter holding, dispensing and slicing dish constructed in accordance with the invention showing the manner in which same is used.

Fig. 2 is a central longitudinal sectional view which may be said to be taken approximately on the plane of the line 2—2 of Fig. 1 looking in the direction of the arrows.

Fig. 3 is a front end elevation of Fig. 2 with the combined closing and slicing plate in its closed position.

Fig. 4 is a cross section on the line 4—4 of Fig. 2 looking in the direction of the arrows.

Fig. 5 is a fragmentary horizontal section on the horizontal line 5—5 of Fig. 4 looking in the direction of the arrows.

Fig. 6 is also a fragmentary sectional view which may be said to be taken approximately on the horizontal line 6—6 of Fig. 2, looking in the direction of the arrows.

Referring now to the drawings by differentiating reference numerals and accompanying lead lines, the dish or container proper is hollow and denoted by the numeral 8 and is elongated and rectangular in cross-section and includes a flat imperforate bottom 10, opposed parallel imperforate vertical side walls 12 and 14, and a top wall 16 having a longitudinal guide slot 18 the latter being provided along one side of the guide slot with a suitably graduated measuring and guiding scale 20 (see Fig. 1). The openable and closable left-hand end portion of the container is provided with a readily applicable and removable rectangular imperforate cover plate 22. This is fitted and held frictionally in place by an inwardly projecting marginal flange means 24 which telescopes into the container and which has recesses to accommodate retaining bosses 26 provided on the side walls of the container. The cover plate, as before stated, is to permit one to have access to the interior for removing the hereinafter described follower means and then successfully cleaning all available interior surfaces of the dish.

At the opposite discharge end, guide tracks are provided. Each track is vertically disposed and takes the form of an angle member and the angle members are denoted by the numerals 28 and 30, respectively. They are identical in construction and the flanges 32—32 are suitably fastened to the side walls 12 and 14, respectively. The remaining fronting flanges 34—34 project slightly across the discharge opening and are spaced from and cooperate with the adjacent end of the container in defining the stated tracks or guides for the closure plate or door 36. This is a flat, substantially rectangular plate having a finger-hook 38 on its upper end. The lower end of the plate is molded or otherwise formed into a feather edge which constitutes a butter cutting or slicing knife 40. (See Fig. 2.) The lower edge portion is also of general wedge-shaped form as at 42, and this part serves as a slice severing, separating and dislodging rib. It facilitates passage of the knife through the print of butter and loosens of the slice or pat as it is cut from the print. The upper opposed edge portions of the flanges 34—34 are widened and the edges are inclined toward each other in divergent relationship as at 44—44 in Fig. 3. These divergent edge portions have keeper notches 46—46 which serve to releasably receive projecting detents 48—48 on the opposite ends of the spreading or dislodging rib 42. The detents ride in a contact with the divergent edge portions 44 and snap releasably into the keeper notches, in an obvious manner. This coaction of elements holds the closure plate "up" to facilitate inserting the print of butter into the container and also permits it to be operated in an alternate manner for convenient slicing results.

The remaining unit is the ejector or follower means 50 and this comprises a rectangular flat plate 52 which is fitted with requisite nicety for sliding within the confines of the container. It has an actuator rib 54 on one side which extends up through and is guided in the slot 20. On the upper protruding end of this rib is a finger-grip or button 56. The latter is in the form of a block and has a central apertured portion fitted over the cooperating end of the actuator rib. The button rides in sliding contact with the surfaces of the top wall 16 and preferably has a knurled apron 58 which constitutes a convenient surface for pushing the ejector and consequently the print of butter so that it may be discharged in a step-by-step manner through the discharge opening. The forward edge 60 of the block is flat and straight across to facilitate returning the ejector 50 to a starting point. One marginal edge of the block is provided with an outstanding lug which is suitably shaped to provide an index 62 and this cooperates, obviously, with the graduations of the aforementioned scale 20.

In practice, the closure plate 36 is lifted to its elevated position and is retained in this position by way of the detents 48 fitting into the keeper notches 46. This permits the print of butter to be conveniently inserted into the dish. Obviously, the slidable ejector or follower, bearing against the inward end of the butter, serves to permit the latter to be projected in a step-by-step manner to be cut into slices or pats A as shown in dotted lines in Fig. 1. In practice, the butter is projected according to the indicating scale. Then, the finger-piece 38 is forced down, releasing the detents 48 from the keeper notches 46 and bringing the slicing knife into play. It will be understood, of course, that the invention herein shown and described is for home or domestic use. It is to take the place of the commonly used quarter-pound print butter dish. For the most part, the average butter dish is in the form of a tray and has an elongated cover which fits over the chunk or print of butter. These dishes are desirable because they protect the butter and make it convenient for the housewife to put it away when it is not in use in the refrigerator, sometimes in a special temperature-controlled compartment therefor. It is, of course, necessary to lift the cover off and on it to render the butter accessible. In the instant situation, one need only slip the print of butter through the open end of the dish, during which time the slicing plate or door is in a lifted, out-of-the-way position. Assuming that the butter dish is empty and that the follow-up plate or slide is adjacent to the now open end of the dish, forcing the butter against the follow-up plate will cause same to ride back, by way of the slot connection to a ready-to-use ejecting position. With the print of butter completely "in" the container portion of the dish, the closure plate 36 is lowered to the position shown in Figure 3. When it is desired to cut off a slice or pat of butter, all that is necessary is to slide the door or closure 36 up to the desired elevation and to eject the butter by way of the slide or follow-up plate 52 and its controlling push button means 56. One may use the scale and index or may simply project the butter sufficiently far to enable him to slice off as much as he wants or needs. Then, by shoving forcibly down on the closure plate, the latter becomes a slicing knife and, what is more important, the rib means 42 serves to separate and dislodge the pat of butter so that the latter is practically served into a butter pat containing dish or onto a larger serving plate.

When washing and cleaning the device, which is often a daily chore, the plug-like cover 22 may be readily removed. The door at the opposite end may be lifted up to and held in its open position for convenient sloshing of the water for complete washing and cleaning purposes. Thus, the butter dish, except for the plate 36 may be dismantled for ready washing and drying purposes.

If desired, the bottom of the container may be provided at its respective corners with supporting feet 64.

In view of the foregoing description taken in conjunction with the accompanying drawings, it is believed that clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A sanitary refrigerator-type butter dish adapted to contain a quarter-pound print of packaged-type butter, to eject the same in a step-by-step manner and slice the ejected portion into pats of predetermined proportional sizes comprising a one-piece butter dish normally closed at one end and having a discharge opening for the ejection and cutting steps at the oppoiste end, a pair of spaced parallel vertically disposed guide tracks mounted on said opposite end, said guide tracks having opposed flanges in a plane with each other, the upper portions of the flanges being widened and provided with keeper notches, a closing plate slidably mounted in said guide tracks and held in place by said flanges, the lower edge of said plate having a feathered cutting edge and the vertical edge portions thereof being provided with outwardly projecting detents, said detents being releasably engageable in said keeper notches, the lower end portion of said plate being provided with a horizontally disposed rib, said rib being wedge-shaped in cross-section and being located in proximity to said feathered edge and cooperating therewith in providing a slice separating and dislodging member.

ROBERT TAYLOR EPPERSON.

References Cited in the file of this patent

UNITED STATES PATENTS

| Number | Name | Date |
|---|---|---|
| 502,170 | Brundin | July 25, 1893 |
| 1,254,952 | Waterbury | Jan. 29, 1918 |
| 1,385,372 | Gorham | July 26, 1921 |
| 1,490,645 | Szwajkart | Apr. 15, 1924 |
| 1,708,771 | Noble | Apr. 9, 1929 |
| 1,917,480 | Widing | July 11, 1933 |
| 1,952,136 | Mueller | Mar. 27, 1934 |
| 2,251,844 | Keefer | Aug. 5, 1941 |
| 2,489,667 | Pennell | Nov. 29, 1949 |